Oct. 29, 1957 J. H. McKEWEN 2,811,053
PRE-SELECT HYDRAULIC SHIFTING MEANS
Filed Aug. 8, 1955 3 Sheets-Sheet 1

INVENTOR.
John Holden McKewen,
BY Allen & Allen
ATTORNEYS.

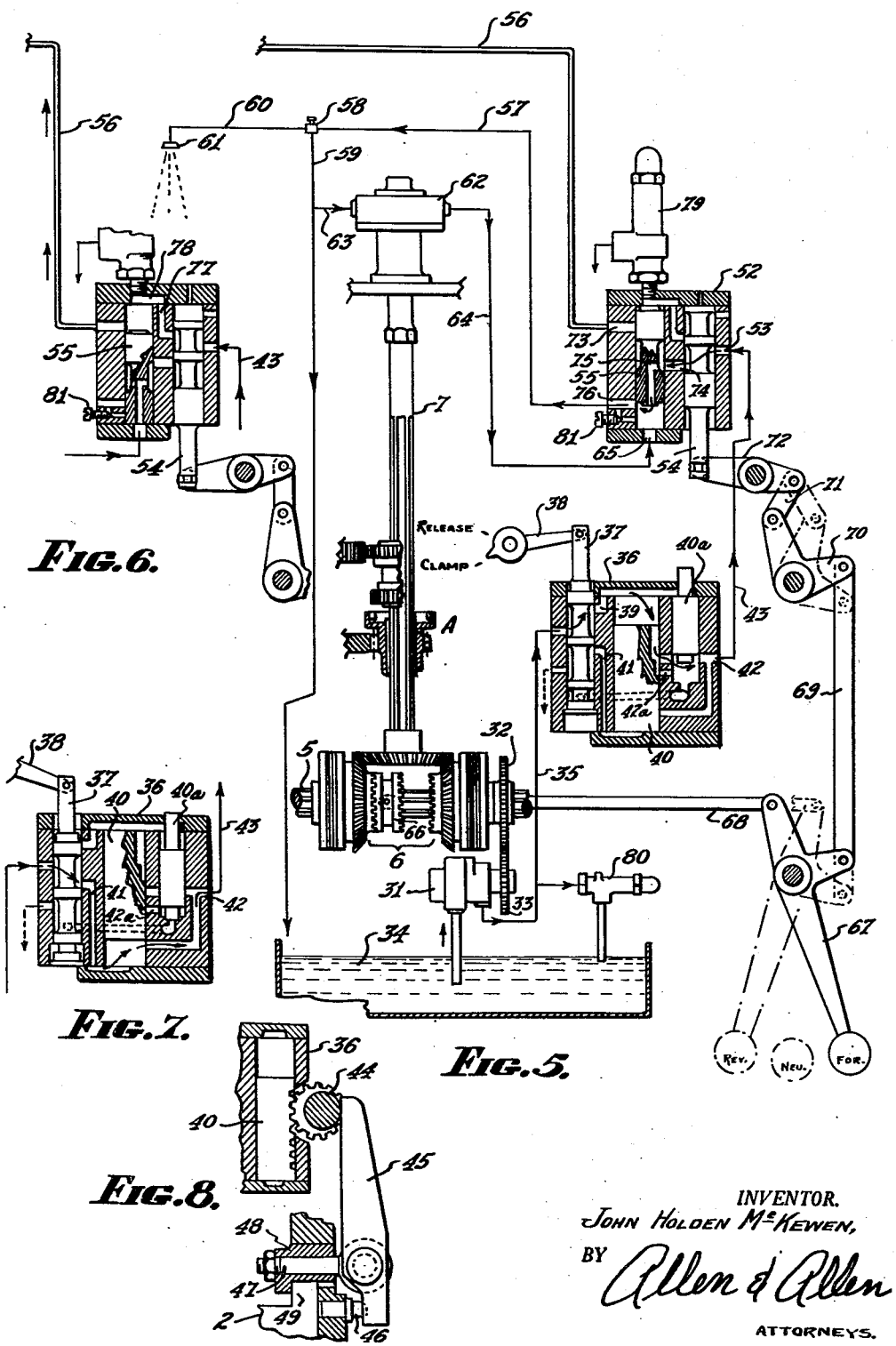

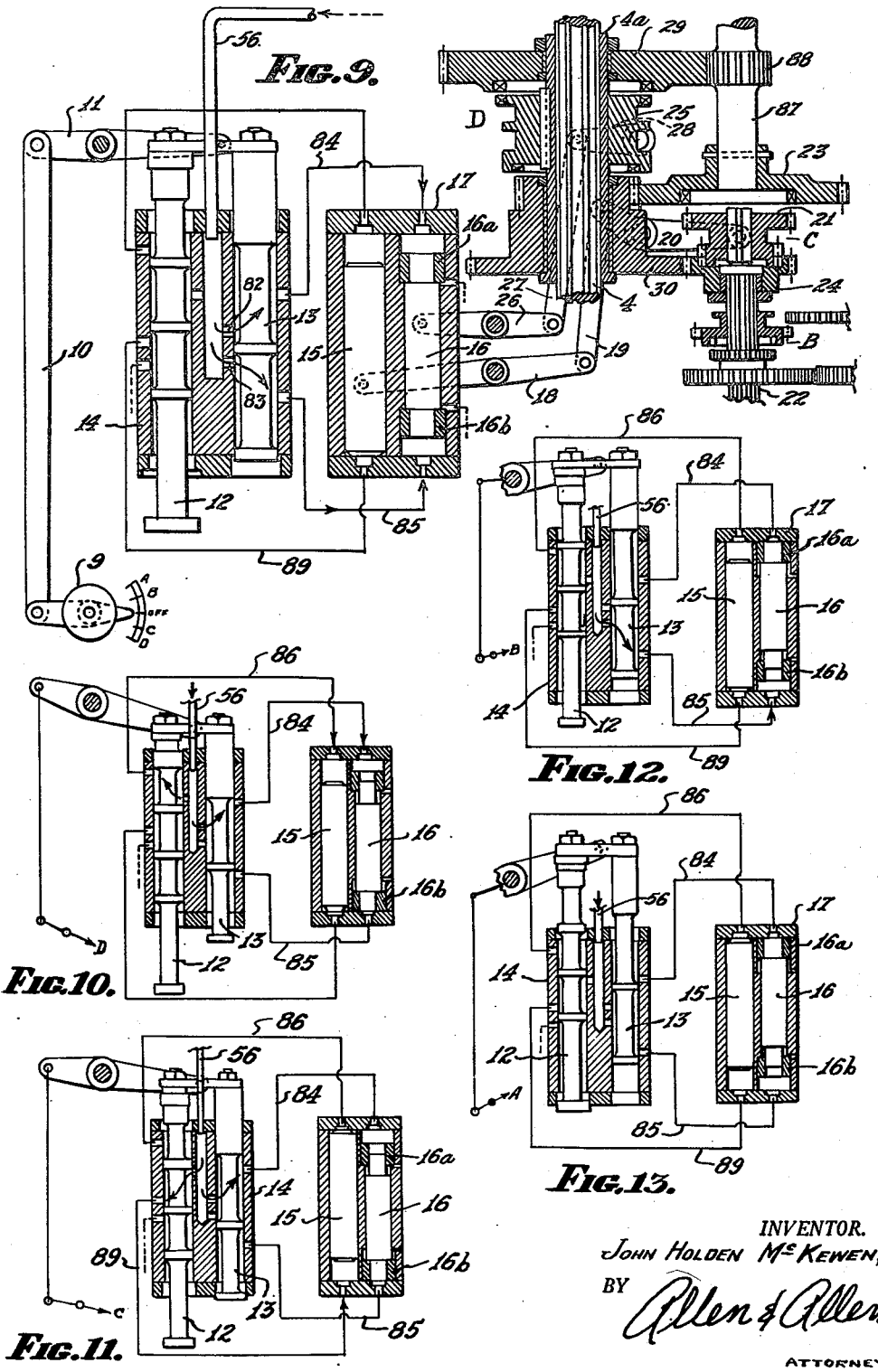

United States Patent Office 2,811,053
Patented Oct. 29, 1957

2,811,053

PRE-SELECT HYDRAULIC SHIFTING MEANS

John H. McKewen, Cincinnati, Ohio, assignor, by mesne assignments, to Giddings & Lewis Machine Tool Company, Fond du Lac, Wis., a corporation of Wisconsin Application August 8, 1955, Serial No. 526,996

17 Claims. (Cl. 77—28)

This invention relates to power transmission mechanism for machine tools and in particular to hydraulic shifting means whereby the desired gear train may be pre-selected and the shifting of the machine gearing initiated while the machine is running.

A principal object of the invention is to eliminate clashing of the gears during shifting by controlling the time element of shifting with a set revolution of the driving gears. While the invention will find utility in various types of machine tools and other applications wherein the shifting of gears is required to alter the operating speed of the machine, it is particularly adapted to radial drills wherein a great many different spindle speeds and feeds must be available for instant use.

A further object of my invention is the provision of a hydraulic shifting circuit wherein the pre-selection of a change speed transmission is accomplished by setting a selector to the desired position while the spindle is running and then moving the clutch lever to neutral. The clutch acts upon a control valve which initiates the shifting cycle by directing fluid under predetermined pressure to a selector valve which in turn acts through a shifting valve to engage the desired gear train.

A further object of the invention is the provision of a hydraulic shifting circuit employing a constant volume pump for supplying fluid under pressure to the control valve and a balancing pump effective, when the clutch is engaged, to supply fluid under pressure to the control valve to counterbalance the fluid pressure of the constant volume pump. When the clutch is disengaged the power to the balancing pump is cut off and as the pump loses momentum the balanced condition of the control valve will be upset, the constant volume pump will become predominant, and the control valve will be actuated to supply fluid under pressure to the selector valve for shifting movement in accordance with the setting of the selector valve.

Still a further object of the invention is the provision of an hydraulic shifting circuit incorporating hydraulically controlled clamping means effective to clamp the tool head to the radial arm in predetermined fixed position.

Yet a further object of the invention is the provision in the tool head of a radial drill of illuminating means for the working end of the spindle, the illuminating means being incorporated in the tool head as integral parts thereof and arranged to give adequate lighting with a minimum of heat.

These as well as other objects of the invention which will appear hereinafter or which will be apparent to the skilled worker in the art upon reading these specifications, I accomplish by that construction and arrangement of parts of which I shall now describe an exemplary embodiment.

Reference is made to the accompanying drawings wherein:

Figure 5 is a semi-diagrammatic view illustrating the basic components of the hydraulic control circuit.

Figure 6 is a semi-diagrammatic view illustrating the control valve of Figure 5 in an alternate position of use.

Figure 7 is a semi-diagrammatic view illustrating the power head clamp of Figure 5 in an alternate position of use.

Figure 8 is a semi-diagrammatic view illustrating exemplary clamping means for securing the tool head to the radial arm.

Figure 9 is a semi-diagrammatic view illustrating the change speed gearing, the shifting valve and the selector valve.

Figures 10 through 13 are semi-diagrammatic views illustrating the selector valve and shifting valve in various positions of use.

Figure 1:
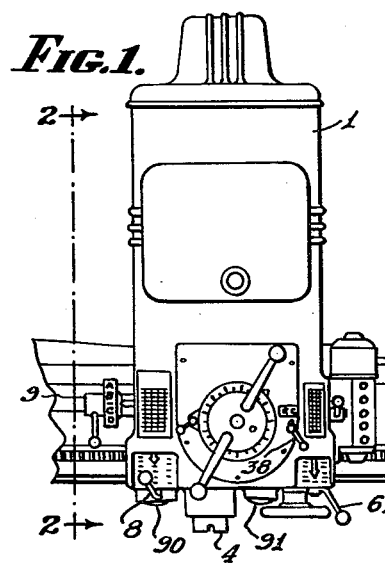
Figure 1 is a front elevation of a tool head in accordance with my invention.

Referring now to Figure 1 of the drawings the tool head 1 of a radial drill is mounted on the radial arm 2, the head being movable therealong in guideway 3. It will be understood that the radial arm 2 is mounted upon an upright column and adapted to move vertically relative to the column. Power for driving the spindle 4 and for elevating the radial arm 2 is derived from a prime mover (not shown) carried on the opposite end of the arm. An arm shaft 5 (Figures 2 and 3) transmits the motor power to the head 1 through reversing mechanism 6 mounted in the rear portion of the head. The reversing mechanism drives a power shaft 7 which acts through the spindle drive train to drive the spindle 4. The spindle drive train is composed of four sets of speed change mechanisms, indicated at A, B, C, and D, the speed change mechanisms A and B comprising the "front" gear speed changes for effecting fine changes in spindle speeds and the "back" gear speed change sets C and D for effecting coarse changes in speed. The instant invention relates specifically to the provision of hydraulically controlled pre-selecting means for the speed change sets C and D, although it will be apparent that similar mechanisms could also be provided for the speed change mechanisms A and B.

The "front" gear sets A and B of the spindle drive train are controlled by a single lever 8 (Figure 1). Since the control of the gear sets A and B does not form a part of the instant invention, the details of their operation have been omitted. These details may be found in Schauer Patent 2,065,476, dated December 22, 1936.

The "rear" gear sets C and D are controlled by the selector 9 which has four positions of use—two for each of the sets C and D. The selector 9 also has an "off" or neutral position. As best seen in Figure 9, the selector 9 acts through the arm 10 and lever 11 to jointly move the valve stems 12 and 13 of the selector valve 14 which in turn controls the positions of the pistons 15 and 16 of shifting valve 17. The piston 15 is connected through suitable linkage, indicated at 18, 19 and 20, to a double-face clutch element 21 forming a part of the speed change mechanism C. The clutch element 21 is adapted to be driven by the shaft 22 to which it is slidably keyed for engagement with one or the other of the gears 23 or 24, depending upon the position of the piston 15. Similarly, the piston 16 controls the movement of a double-face clutch element 25 slidably keyed to the spindle driving member 4a which is connected to the spindle 4, the clutch element 25 comprising a part of the speed change mechanism D. The clutch element 25 is movable through the linkage 26, 27 and 28 from a neutral position, as illustrated, into engagement with either the gear 29 or the gear 30, both of which are rotatably journaled on the spindle driving member 4a. The operation of the change speed mechanisms C and D will be explained more fully hereinafter.

Referring now to Figure 5 of the drawings, a constant volume pump 31 is driven from the arm shaft 5 through the gears 32 and 33, the pump 31 being arranged to pump hydraulic fluid from a reservoir 34 through a conduit 35 to a power head clamping valve 36. The clamping valve has a valve spool 37 movable by means of a lever 38 (see also Figure 1) from a "clamp" to a "release" position. When in the "clamp" position the spool 37 will cause the hydraulic fluid to flow through the passageway 39, thereby moving the piston 40 downwardly. When the lever 38 is in the "release" position, the valve spool 37 will cause the hydraulic fluid to flow through the passageway 41, thereby causing the piston 40 to move upwardly to the position seen in Figure 7. In either position of the piston 40 the hydraulic fluid will exit from the clamping valve through the passageway 42 and conduit 43. The clamping valve is also provided with a control piston 40a which serves in its lowermost position to close the passageway 42 to the flow of fluid through the passageway 39 until such time as the piston 40 shall have reached its lowermost position, whereupon fluid to elevate the control piston 40a will be supplied to the under side thereof through the supplementary passageway 42a. With this arrangement the full pressure developed by the pump 31 will be utilized to drive the piston 40 to the clamping position, whereupon the pressure will be relieved by the upward movement of the control piston 40a which permits the fluid to flow into the conduit 43.

The action of the piston 40 is diagrammatically illustrated in Figure 8. As the piston moves downwardly to the "clamp" position it acts upon an eccentric 44 which pushes outwardly against the upper end of an arm 45 movable about a fulcrum post 46. As the arm 45 is moved outwardly the rod 47 connected thereto draws the clamp 48 tightly against the flange 49 of the radial arm 2, thereby clamping the tool head to the radial arm. When the lever 38 is moved to the release position the piston 40 will move upwardly, thereby moving the eccentric 44 in the opposite direction and releasing the arm 45 and the clamp 48.

Figure 2:
Figure 2 is a side elevational view with parts broken away of the tool head taken along the line 2—2 of Figure 1.
Figure 2:
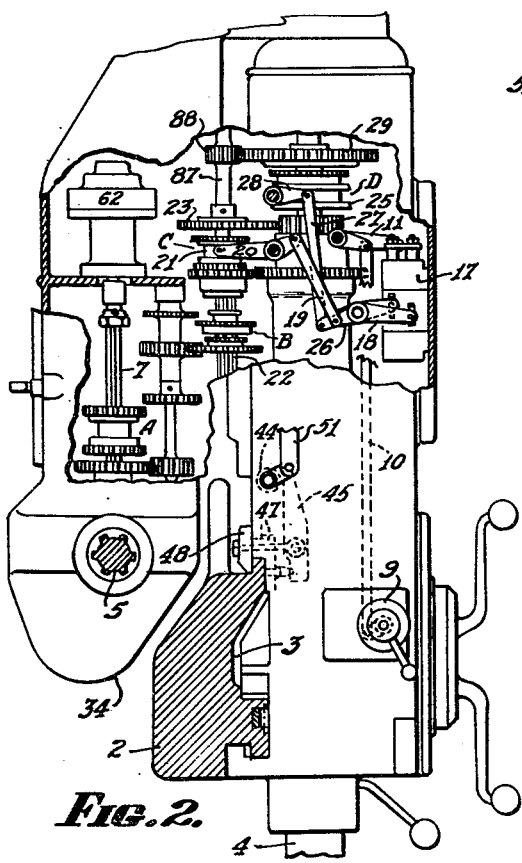
Figure 3:
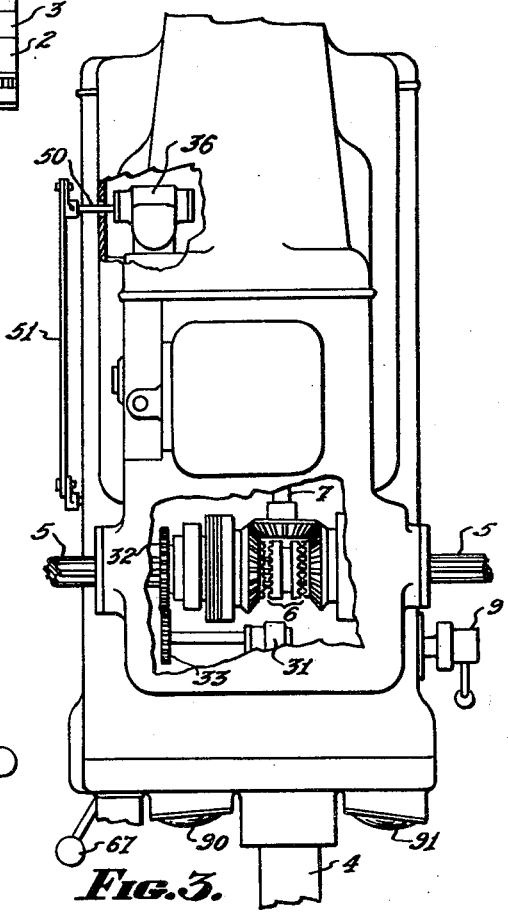
Figure 3 is a rear elevational view with parts broken away of the tool head.

It will be understood that the representation in Figure 8 is purely diagrammatical. In actual practice, as seen in Figures 2 and 3, the piston 40 would rock a shaft 50 which would act through an arm 51 to move the eccentric 44.

From the power head clamping valve the hydraulic fluid is passed through the conduit 43 to the control valve 52 where it entered the valve through a passageway 53. Depending upon the positions of the control valve stem 54 and the compensating piston 55, the hydraulic fluid will be directed either through the conduit 56 leading to the selector valve 14 or else through the conduit 57 to the bypass 58 for recirculation through the conduit 59 or for passage through the conduit 60 to the cascade 61.

A balancing pump 62 is driven by power shaft 7. The balancing pump is a reversing type pump and will have approximately three times the volume capacity at the same R. P. M. as the constant volume pump 31. Hydraulic fluid is supplied to the inlet side of the pump 62 through the branch conduit 63, and on the outlet side the fluid passes through conduit 64 to the passageway 65 at the lower end of the compensating piston 55.

The power to the balancing pump 62 will be disconnected when the driving clutch 66 forming a part of the reversing mechanism 6 is disengaged by movement of the clutch lever 67 to the neutral position, the clutch lever 67 acting through an arm 68 operatively connected to the driving clutch. The control valve stem 54 is also connected to the clutch lever 67 through the arm 69, bell crank 70, link 71 and lever 72. The arrangement of the bell crank, the link and the lever is such that the control valve stem 54 will be in its uppermost position, as illustrated in Figure 5, when the clutch lever is in either the forward or the reverse position, the control valve stem being moved to the lowermost position, illustrated in Figure 6, only when the clutch lever is in neutral position and the driving clutch 66 disengaged, thereby disconnecting the power to the balancing pump.

When the clutch 66 is engaged, i. e. when the clutch lever 67 is in either forward or reverse, the hydraulic fluid flowing through the conduit 64 and the passageway 65 will move the compensating piston to its uppermost position, thereby closing passageway 73 leading to the conduit 56 and causing the hydraulic fluid entering the control valve through the passageway 53 to pass through the port 74 and the bore 75 in the compensating piston. The hydraulic fluid from both the pumps will thus pass from the control valve through the passageway 76 for recirculation through the conduit 57.

When the clutch lever is moved to neutral, the control valve stem 54 assumes the position illustrated in Figure 6, whereupon the hydraulic fluid from the conduit 43 passes through the ports 77 and 78 so as to move the compensating piston downwardly. At the same time the power to the balancing pump 62 through the shaft 7 will have been cut off and the only power to the pump will be the momentum of the gear train. As the speed of the pump decreases, the volume and pressure of the hydraulic fluid flowing through the conduit 64 will also decrease, thereby permitting the downward movement of the compensating piston 55 when the speed of the gear train and the pump reaches a predetermined reduced number of revolutions. In other words, as the balancing pump loses momentum, the constant volume pump becomes predominant and forces the piston to open the passageway 73, thereby causing the fluid to be directed through the conduit 56 to the selector valve 14 at a predetermined pressure. The pressure at which the fluid is delivered through the conduit 56 will be determined by the relief valve 79; and similarly, a relief valve 80 will be provided in the conduit 35 to control the power for the clamping valve 36 and at the same time protect the constant volume pump 31.

An adjustable needle valve 81 is provided in the lower end of the cylinder of compensating piston 55 to give a more exact setting of the time element of shifting at the proper revolutions of the gear train.

Referring again to Figure 9, if the selector 9 is in the "off" position, the hydraulic fluid flowing through the conduit 56 upon movement of the clutch lever 67 to neutral position, will pass through the orifices 82 and 83 and exit through the conduits 84 and 85 connected, respectively, to the upper and lower ends of the piston 16. Sleeves 16a and 16b at the ends of the piston 16 will seat against shoulders in the cylinder to stabilize the piston in the neutral position. With the piston 16 maintained in the intermediate or neutral position the double face clutch element 25 will also remain in neutral position and the spindle 4 will remain idle.

If, however, the selector 9 is in the low range position, as illustrated in Figure 10, the valve stems 12 and 13 will be moved to the positions illustrated, in which event the fluid entering through the conduit 56 will flow through the valve in the manner indicated by the arrows, the fluid passing through the conduit 84 acting to move the piston 16 downwardly, and at the same time the fluid flowing through the conduit 86 will move the piston 15 downwardly if it is not already in its lowermost position. The downward movement of the piston 16 will cause the clutch element 25 to engage with the gear 29 and hence operatively connect the spindle 4 to the gear 29 which is in turn driven from the shaft 22 through the clutch element 21, the gears 24, 30 and 23, respectively, the latter gear being operatively connected to the gear 29 by means of stud shaft 87 and a gear 88.

When the selector 9 is moved to the second range position, as illustrated in Figure 11, the valve stem 12 will close conduit 86 and cause the fluid to flow through a conduit 89 to the lower end of the piston 15, thereby raising the piston to its uppermost position. The valve stem 13, on the other hand, will continue to maintain the conduit 84 open and the conduit 85 closed, thereby retaining the piston 16 in its lowermost position. Movement of the piston 15 to the uppermost position will act to disengage the clutch element 21 from the gear 24 and engage it with the gear 23, thereby driving the gear 23 directly from the shaft 22.

The third range of the selector is illustrated in Figure 12 wherein it will be seen that the valve stem 12 will direct the fluid through the conduit 86 to move the piston 15 to its lowermost position, and similarly the valve stem 13 will cause fluid to flow through the conduit 85 to elevate the piston 16. This reversal of the positions of the two pistons causes the clutch element 21 to drive the gear 24 and through it the gear 30 which is coupled directly to the spindle through the clutch element 25 which is engaged therewith.

The fourth or high range position of the selector valve is illustrated in Figure 13 wherein it will be seen that the position of the piston 15 will have been reversed by the closing of the conduit 86 and the opening of the conduit 89. This results in the engagement of the clutch element 21 with the gear 23 which drives the gear 30 and the clutch element 25 in engagement therewith, the piston 16 being in its uppermost position.

From the above it will be apparent that the desired driving range of the spindle may be pre-selected by setting the selector 9 to any one of the range positions, whereupon subsequent movement of the clutch lever 67 to neutral will act to deenergize the balancing pump and thereby initiate movement of the compensating piston in the control valve to open the conduit 56 to the flow of fluid therethrough. The shifting will be accomplished while the gear train and spindle are still moving although they are not positively driven at the time of shifting. It may also be pointed out that the pre-selecting of the desired change gear sets may be accomplished while the driving clutch is in neutral, i. e. disengaged, in which event the control valve will be open and the shifting will take place immediately. Similarly, it may be pointed out that when the selector 9 is in the neutral or "off" position the clutch element 25 will be disengaged and the spindle will be completely free from the gear train and hence may be turned or stopped, as the case may be, by hand.

Figure 4:
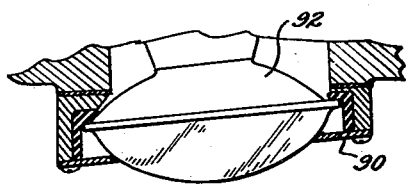
Figure 4 is an enlarged partial sectional view illustrating spindle illuminating means associated with the tool head.

It is also within the spirit of my invention to provide illuminating means 90 and 91 (Figure 1) mounted on the lower surface of the tool head and arranged to direct beams of light toward the working end of the spindle. Such light sources may be formed as an integral part of the tool head in the manner illustrated in Figure 4 wherein the light source 90 is shown to comprise a sealed beam unit 92 recessed in the tool head. It will be readily appreciated that the light is such that an excessive amount of heat, which is characteristic of a high wattage incandescent lamp, would upset the operation as well as the precision of the spindle. In order to provide adequate lighting with a minimum amount of heat, I prefer to employ a ⅝ volt sealed-beam lamp with low wattage, and then further reduce the voltage and wattage through resistance, either by a commercial resistor or by calibrating the size and length of wire from transformer to the lamps. As a non-limiting example, a light source applied at approximately 4 volts and 4½ watts produces highly satisfactory results. This reduction not only minimizes the heat produced by the lights but it also multiplies their life span and still retains enough brilliancy for proper illumination.

Modifications may, of course, be made in my invention without departing from the spirit of it. Having, however, described my invention in an exemplary embodiment, what I desire to secure and protect by Letters Patent is:

1. An hydraulic control system for the pre-select shifting of change gear mechanism comprising means for driving said change gear mechanism, clutch means for operatively connecting said change gear mechanism to said drive means and for disengaging it therefrom, a shifting valve operatively connected to said change gear mechanism for shifting said change gear mechanism upon movement of said shifting valve, a selector valve for supplying hydraulic fluid to said shifting valve in accordance with a predetermined setting of said selector valve, a control valve for supplying hydraulic fluid under pressure to said selector valve in response to the movement of said clutch means to the disengaged position, said control valve including means effective to prevent the flow of fluid to said selector valve prior to a predetermined reduction in the speed of said change gear mechanism.

2. An hydraulic control system for the pre-select shifting of change gear mechanism comprising means for driving said change gear mechanism, clutch means for operatively connecting said change gear mechanism to said drive means and for disengaging it therefrom, a shifting valve operatively connected to said change gear mechanism for shifting said change gear mechanism upon movement of said shifting valve, a selector valve for supplying hydraulic fluid to said shifting valve in accordance with a predetermined setting of said selector valve, a control valve for supplying fluid under pressure to said selector valve, said control valve including compensating means responsive to a predetermined reduction in the speed of rotation of said change gear mechanism upon movement of said clutch means to the disengaged position to supply fluid under predetermined pressure to said selector valve.

3. An hydraulic control system for the pre-select shifting of change gear mechanism comprising means for driving said change gear mechanism, clutch means for operatively connecting said change gear mechanism to said drive means and for disengaging it therefrom, a shifting valve operatively connected to said change gear mechanism for shifting said change gear mechanism upon movement of said shifting valve, a selector valve for supplying hydraulic fluid to said shifting valve in accordance with a predetermined setting of said selector valve, a control valve for supplying fluid under pressure to said selector valve, said control valve including counterbalancing means effective to direct fluid to said selector valve only upon disengagement of said clutch means.

4. In an hydraulic shifting circuit for a machine tool, a shifting means, an hydraulic selector for controlling the movement of said shifting means, a control valve for said selector, a constant volume pump for supplying fluid under pressure to said control valve, a balancing pump for supplying additional fluid under pressure to said control valve to counterbalance the fluid pressure from said constant volume pump, means for driving said balancing pump, and means for disengaging said balancing pump from said driving means, whereby as said balancing pump loses momentum the balanced condition of the control valve will be upset, the constant volume pump will become predominant, and the control valve opened to supply fluid under pressure to said selector valve for the actuation of said shifting means in accordance with the setting of the said selector.

5. In an hydraulic shifting circuit for a machine tool, a shifting means, an hydraulic selector for actuating said shifting means in accordance with a predetermined setting of said selector, a control valve for supplying fluid under pressure to said selector, a constant volume pump for supplying fluid to said control valve, a balancing pump for supplying additional fluid to said control valve to counterbalance the fluid pressure from said constant volume pump, means for energizing said balancing pump, and means effective to upset the balance condition of the control valve by deenergizing said balancing pump, whereby said constant volume pump will become predominant and the control valve will be opened to the flow of fluid under pressure from the constant volume pump to said selector for shifting movement of said shifting means in accordance with the setting of said selector.

6. In a radial drill having an arm movably mounting a tool head, a variable speed power transmission including a plurality of speed change gear units mounted within said tool head, a drill spindle journaled in said tool head and adapted to be driven by said power transmission, and a forward and reverse transmission including a shiftable clutch element for operatively connecting said power transmission to a source of power, said clutch element having forward, reverse and neutral positions, an hydraulic shifting circuit for said speed change gear units comprising a selector for predetermining the settings of the speed change gear units, a shifting means responsive to the setting of said selector for shifting said speed change gear units, a control valve for supplying fluid under pressure to said selector, and means responsive to the shifting of said clutch element to the neutral position for opening said control valve for the flow of fluid under pressure to said selector.

7. In a radial drill having an arm movably mounting a tool head, a variable speed power transmission including a plurality of speed change gear units mounted in said head, a drill spindle journaled in said head and adapted to be driven by said power transmission, and a forward and reverse transmission including a shiftable clutch element for operatively connecting said power transmission to a source of power, said clutch element having forward, reverse and neutral positions, an hydraulic circuit for actuating said speed change gear units comprising a selector for predetermining the settings of said speed change gear units, means for shifting said speed change gear units in accordance with the setting of said selector, a control valve for said selector, a constant volume pump for supplying fluid under pressure to said control valve, a balancing pump for supplying additional fluid under pressure to said control valve to counterbalance fluid pressure from said constant volume pump, said balancing pump being operatively connected to said power transmission and adapted to be deenergized upon the shifting of said clutch element to the neutral position, whereby to produce an unbalanced condition in said control valve upon the disengagement of said clutch, which condition results in the opening of said control valve for the flow of fluid under pressure from said constant volume pump to said selector.

8. The device claimed in claim 7 including a power head clamping valve operatively connected to said constant volume pump, said clamping valve including a piston movable from a release to a clamping position, a valve spool for determining the position of said piston, and means associated with said tool head for clamping it to said arm, said clamping means being operatively connected to said piston for movement thereby.

9. The device claimed in claim 7 wherein said control valve includes a control valve stem operatively connected to said clutch element and movable, upon movement of said clutch element to the neutral position, from a bypass to a selector supplying position, and a compensating piston in said control valve normally biased to bypass position under the influence of fluid pressure from said compensating pump, said compensating piston being movable to a selector supply position upon a predetermined reduction in fluid pressure from said compensating pump.

10. The device claimed in claim 7 wherein said selector comprises a selector valve having a pair of valve stems therein movable to a plurality of positions depending upon the position of a selector indicator operatively connected to said valve stems, and circuit means responsive to the several settings of said valve stems for directing hydraulic fluid from said selector to said shifting means.

11. The device claimed in claim 10 wherein said shifting means comprises a shifting valve having a pair of pistons therein each operatively connected by said circuit means to one of the valve stems in said selector valve, and a connection between each of said pistons and a clutch element forming a part of said speed change gear units.

12. The device claimed in claim 7 including a pair of low voltage-low wattage sealed beam light sources mounted in the lower portion of said tool head, one on each side of said spindle, said light sources being arranged to direct beams of light toward the working end of said spindle.

13. In a radial drill having an arm movably mounting a tool head, a variable speed power transmission including a plurality of speed change gear units mounted in said head, a drill spindle journaled in said head and adapted to be driven by said power transmission, and a forward and reverse transmission including a shiftable clutch element for operatively connecting said power transmission to a source of power, said clutch element having forward, reverse and neutral positions, circuit means for actuating said speed change gear units, said circuit means comprising a selector for predetermining the desired settings of said speed change gear units, means for shifting said speed change gear units in accordance with the predetermined setting of said selector, a control means for said selector, and means responsive to the shifting of said clutch element to the neutral position for actuating said control means and through it said selector and said shifting means.

14. In a radial drill having an arm movably mounting a tool head, a variable speed power transmission including a plurality of speed change gear units mounted in said head, a drill spindle journaled in said head and adapted to be driven by said power transmission, and a forward and reverse transmission including a shiftable clutch element for operatively connecting said power transmission to a source of power, said clutch element having forward, reverse and neutral positions, an hydraulic circuit for actuating said speed change gear units, said circuit comprising a selector for predetermining the shifting of said speed change gear units, means operatively connected to said selector for shifting said speed change gear units in accordance with the setting of the selector, a control valve for actuating said shifting means, a constant volume pump for supplying fluid under pressure to said control valve, a balancing pump for supplying additional fluid under pressure to said control valve to counterbalance fluid pressure from said constant volume pump, said balancing pump being operatively connected to said power transmission and adapted to be deenergized upon shifting of said clutch element to the neutral position, whereby the only remaining power to said balancing pump consists of the momentum of said power transmission, whereby as the speed of the said power transmission is reduced, the fluid pressure supplied by said balancing pump will be diminished and the balanced condition in said control valve will be upset, whereupon the constant volume pump will predominate and fluid under pressure will be supplied by the control valve to said selector and through it to said shifting means.

15. In a radial drill having an arm movably mounting a tool head, a variable speed power transmission including a plurality of speed change gear units mounted in said head, a drill spindle journaled in said head and adapted to be driven by said power transmission, and a forward and reverse transmission including a shiftable clutch element for operatively connecting said power transmission to a source of power, said clutch element having forward, reverse and neutral positions, circuit means for actuating said speed change gear units, said circuit means comprising a selector for predetermining the desired settings of said speed change gear units, means for shifting said speed change gear units in accordance with the predetermined setting of said selector, a control means for said selector, and means responsive to the shifting of said clutch element to the neutral position for actuating said control means and through it said selector and said shifting means, said circuit means including a tool head clamping means adapted to clamp said tool head to said arm.

16. In a radial drill having an arm movably mounting a tool head, a variable speed power transmission including a plurality of speed change gear units mounted in said head, a drill spindle journaled in said head and adapted to be driven by said power transmission, and a reversible clutch for operatively connecting said power transmission to a source of power, circuit means for actuating said speed change gear units, said circuit means comprising a selector for predetermining the desired settings of said speed change gear units, said selector having a plurality of operating positions and a neutral position, means for shifting said speed change gear units in accordance with the predetermined setting of said selector, a control means for said selector, and means responsive to the disengagement of said reversible clutch for actuating said control means and through it said selector and said shifting means, said shifting means acting, when said selector is in the neutral position, to disconnect said spindle from said power transmission, whereby to free said spindle for movement independently of said variable speed transmission.

17. In a radial drill having an arm movably mounting a tool head, a variable speed power transmission including a plurality of speed change gear units mounted in said head, a drill spindle journaled in said head and adapted to be driven by said power transmission, said spindle being operatively connected to said power transmission by means of a clutch element movable from a spindle engaging position to a neutral position, a forward and reverse transmission including a second shiftable clutch element for operatively connecting said power transmission to a source of power, said second clutch element having forward, reverse and neutral positions, circuit means for actuating said speed change gear units, said circuit means comprising a selector for predetermining the desired settings of said speed change gear units, said selector having a plurality of operating positions and a neutral position, means for shifting said speed change gear units in accordance with the predetermined setting of said selector, a control means for said selector, and means responsive to the shifting of said second clutch element to the neutral position for actuating said control means and through it said first named selector and said shifting means, said shifting means acting, in the neutral position of said selector, to move said clutch element to the neutral position, whereby to free said spindle for rotation independently of said power transmission.

References Cited in the file of this patent

UNITED STATES PATENTS

| | | |
|---|---|---|
| 1,831,213 | Wagner | Nov. 10, 1931 |
| 1,897,591 | Scholz | Feb. 14, 1933 |
| 2,330,426 | Hoelscher | Sept. 28, 1943 |